Patented May 2, 1944

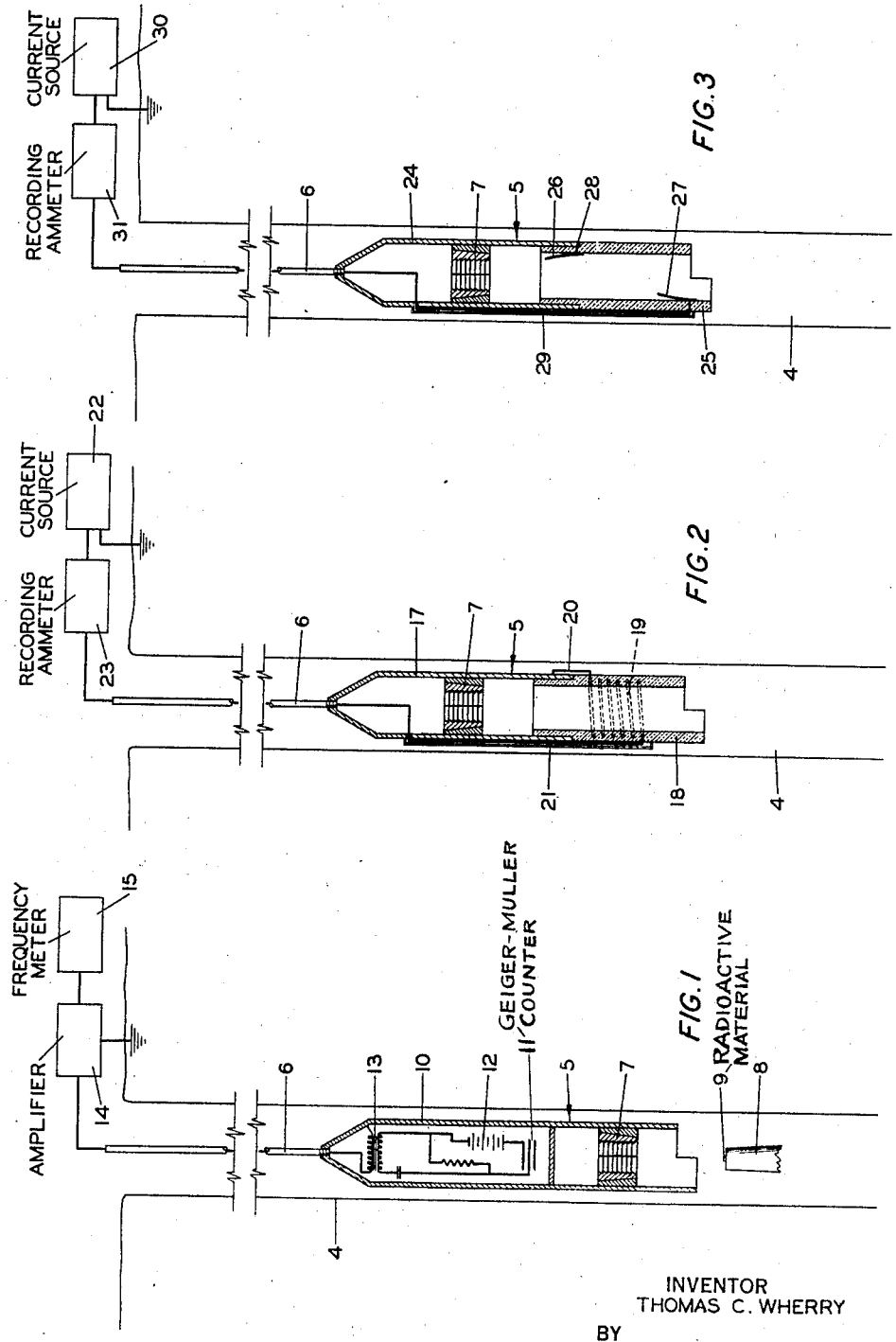

2,347,759

UNITED STATES PATENT OFFICE 2,347,759

FISHING TOOL

Thomas C. Wherry, Bartlesville, Okla., assignor to Phillips Petroleum Company, a corporation of Delaware Application March 29, 1941, Serial No. 385,927

5 Claims. (Cl. 177—311)

This invention relates to apparatus for locating and recovering objects in well bores.

During the processes of drilling and producing wells, it is sometimes necessary to recover from the well bore, tools or other objects which have become disconnected from the surface equipment. Ordinarily it is difficult for the operator at the surface of the earth to determine when the lost equipment has been engaged by the fishing tool. Much time is required in fishing operations in withdrawing the fishing tool to determine whether or not the fish is attached thereto. Several unsuccessful round trips from the top of the hole to the equipment, due either to failure of the tool to pick up the "fish" or to the detachment of the fish from the tool during the up trip, are usually made. Sometimes the fishing operations require several days before the lost equipment is successfully recovered from the well bore. An advantage which this invention offers to the practice of fishing is that it enables the operator to determine when the tool is near the object to be recovered, whether the object has been picked up, and at any point on the way out, whether it is still attached.

An object of this invention is to provide improved apparatus for locating and recovering objects in well bores.

Another object of this invention is to provide apparatus for determining at any time during a fishing operation whether an object is attached to the fishing tool.

Figure 1 is a vertical cross section through a well bore illustrating diagrammatically a preferred embodiment of the present invention.

Figure 2 is a vertical cross section through a well bore illustrating diagrammatically a modification of the present invention.

Figure 3 is a vertical cross section through a well bore illustrating diagrammatically another modification of the present invention.

With reference to the drawing, the numeral 4 designates a well bore in which an overshot fishing tool 5 is suspended in the well bore by an extensible and retractable electrical conductor 6, which is insulated from the fluid in the well and provides for lowering and raising the fishing tool in the well bore. The insulated conductor 6 may be separate from the tool suspension means if desired. The fishing tool 5 is provided with slips 7 which engage the equipment to be recovered when the fishing tool is properly positioned relative to the fish.

In Figure 1 of the drawing, the numeral 8 designates the object which is to be removed from the well bore by the fishing tool. Attached to object 8 is a capsule 9 containing a small amount of radioactive material. The body 10 of fishing tool 5 may be made of any suitable material, preferably metal, and contains equipment for detecting the proximity of radioactive substances, an arrangement of the well-known Geiger-Muller counter 11 being shown. A potential is applied across the Geiger-Muller counter 11 by the batteries 12 and the high impedance Geiger-Muller counter matched to conductor 6 by the transformer 13. When the counter is excited by gamma rays emanating from capsule 9, short pulses of current are produced in the counter circuit and these pulses are transmitted through conductor 6 to the amplifier 14 at the surface of the earth. After amplification the pulses of current pass to the recording frequency meter 15 which makes a record of the radioactive emanations picked up by the Geiger-Muller counter. The electrical circuit including the recorder is completed through the earth to which the amplifier is connected.

The operation of the apparatus shown in Figure 1 is as follows: Objects which are likely to be lost during drilling operations, for example, drilling tools and service instruments, are prepared prior to their introduction into the well bore by bolting, welding or otherwise attaching to the object the capsule containing radioactive material. In the event that the object is lost in the well bore, a suitable fishing tool, equipped as shown in Figure 1, is lowered into the well, and its approach to the lost object is indicated by the instruments at the top of the well. This is due to an increase in the intensity of radioactive emanations picked up by the Geiger-Muller counter from the previously placed source of radioactive emanations. When no further increase in radioactivity is indicated the tool is in close proximity to the object. After the customary movements of the fishing tool are carried out in an attempt to pick up the fish, the tool is raised in the well bore. If the concentration of radioactivity decreases, the fish is not attached to the tool and the operator is able to return the tool to the proper location by a motion of only a few feet. After each attempt to pick up the fish the tool is raised in the well bore. If the radioactivity does not decrease, the object is attached to the tool, and may be withdrawn from the well bore. Furthermore, at all times during the trip out, the attachment of the object to the tool is indicated by the instruments at the surface.

In Figure 2, the body of tool 5 is made up of two portions, one portion 17 being made of metal and the other portion 18 being made of material of relatively low magnetic permeability, Bakelite being an example of such material. Portion 18 of the body is equipped with a coil of wire 19, having one end grounded to part 17 of the body by any suitable electrical connection 20, and the other end connected to conductor 6 by insulated conductor 21. A constant voltage is applied by alternating current source 22 through current indicator or recorder 23 across conductor 6 and the ground.

The operation of the apparatus shown in Figure 2 is as follows: This system may be used to fish for any object which is made of a material of relatively high magnetic permeability. The tool is lowered into the well bore, and as the object enters the magnetic field set up by the coil 19 of the detector, the reluctance of the magnetic circuit decreases and the inductance increases. This causes a decrease in the current in the circuit, which varies with the position of the object in the electromagnetic field, and the operator is thus informed of the relative positions of the object and tool by the action of the current indicator at the surface of the earth. As described with reference to Figure 1, the attachment of the fish to the tool may be ascertained at any time.

In Figure 3, the body of tool 5 is made up of two portions, one portion 24 being made of metal and the other portion 25 being made of a nonconductor, such as Bakelite. This nonconducting portion of the body is equipped with two contact springs 26 and 27. The contact 26 is grounded to part 24 of the body by any suitable electrical connection 28, and the contact 27 is connected to conductor 6 by insulated conductor 29. Only a small area is exposed to the fluid in the well by contact 27. The body 24, 25 of the tool may be made entirely of one material, such as metal, and spring contact 27 insulated from the body. Contact 26 may be omitted if desired, the engagement of the fish with contact 27 being sufficient to change the effective area exposed to the fluid in the well. A constant voltage is applied by current source 30 between the conductor 6 and the ground. The ammeter 31, interposed between the source of current 30 and the conductor indicates the amount of current flowing in the electrical circuit.

The operation of the apparatus shown in Figure 3 is as follows: This system may be used to fish for any object made of an electrical conducting material. However, unlike the systems described above, it is not responsive to the proximity of an object and the tool, but only to contact of an object with the tool. The two contact springs are so spaced as to enable the object to make electrical contact between them. The area of the contact surface 27 is preferably small so that only a small surface is exposed to the fluid of the well bore. A small current may flow through the electrical circuit due to the conductivity of the wall fluid. An increase in the area thus exposed to the fluid allows an increased current to flow. This occurs when upon lowering the fishing tool into the well bore, the fish makes electrical connection between the contacts or with contact 27 only. In this way, the operator is informed of the engagement of tool and fish. By observation of the ammeter 31 the operator may readily determine when the fishing tool is correctly positioned relative to the fish and whether or not the fish is attached on the up trip of the fishing tool.

In the drawing and the foregoing detailed description of this invention, the fishing tool shown and described is of the type known in the industry as an "overshot" fishing tool. It is to be understood that the present invention is not to be confined to use with this type tool. The application of this invention to other types of fishing tools will be apparent to those skilled in the art. Various changes may be made in the size, shape and relative position of the parts without departing from the spirit of the invention.

I claim:

1. In apparatus for locating and recovering an object in a well bore, the combination comprising a housing that is open at its lower end and that is adapted to be moved through the well bore and to receive at least a portion of the object through said open lower end, means within the housing for engaging the object when a predetermined portion thereof has been received in the housing, an electric circuit including means within the housing and responsive electrically to variations in the distance between the housing and the object, a source of electric current, and an indicator responsive to electrical variations in the circuit.

2. The combination in accordance with the preceding claim wherein the first mentioned means is adapted to releasably grip the object when a predetermined portion thereof has been received in the housing.

3. In apparatus for locating and recovering a magnetic object in a well bore, the combination comprising a housing that is open at its lower end and that is adapted to be moved through the well bore and to receive at least a portion of the object through said open lower end, means within the housing for engaging the object when a predetermined portion thereof has been received in the housing, an electric circuit including a detector contained in the housing and responsive to the magnetic permeability of the object, and an indicator exterior the well bore in electrical communication with the detector.

4. In apparatus for locating and recovering a magnetic object in a well bore, the combination comprising a housing that is open at its lower end and that is adapted to be moved through the well bore and to receive at least a portion of the object through said open lower end, means within the housing for engaging the object when a predetermined portion thereof has been received in the housing, an electric circuit including coiled detector means carried by the housing and forming a passage into which at least a portion of the object is adapted to be disposed, and an indicator exterior the well bore in electrical communication with the detector means.

5. In apparatus for locating and recovering a magnetic object in a well bore, the combination comprising a housing that is open at its lower end and that is adapted to be moved through the well bore and to receive at least a portion of the object through said open lower end, means within the housing for engaging the object when a predetermined portion thereof has been received in the housing, an electric circuit including coiled detector means in the housing intermediate the above mentioned means and the open end of the housing and forming a passage into which at least a portion of the object is adapted to be disposed, said detector means being responsive to the magnetic permeability of the object, and an indicator exterior the well bore in electrical communication with the detector means.

THOMAS C. WHERRY.